United States Patent Office 3,134,712
Patented May 26, 1964

3,134,712
SYNERGIZED INSECTICIDAL COMPOSITIONS
William G. Bywater, Upper Montclair, N.J., and Robert W. Price, Pearl River, N.Y., assignors to S. B. Penick and Company, New York, N.Y., a corporation of Delaware
No Drawing. Filed Jan. 12, 1962, Ser. No. 165,961
9 Claims. (Cl. 167—30)

This invention relates to compositions of matter classified as synergistic insecticidal compositions and to processes for using such compositions.

The invention sought to be patented, in its composition aspect, is described as residing in the concept of synergistic insecticidal compositions comprising a phenyl carbamate wherein one hydrogen on the carbamyl-nitrogen is replaced by a lower-alkyl radical and wherein the phenyl ring bears at least one substituent in a position other than that para to the carbamyloxy group, said substituent being selected from the group consisting of lower-alkyl radicals and halogens having an atomic weight greater than 25, having added thereto at least one five hundredth part by weight of a pyrethrin and at least one-fortieth part by weight of a 3,4-methylenedioxyphenyl-pyrethrin-potentiator per part of the said phenyl carbamate.

The invention sought to be patented, in its process aspect, resides in the concept of killing insects by contacting them with the aforesaid compositions.

As used herein, the term "lower-alkyl" means saturated monovalent aliphatic radicals of the general formula $-C_nH_{2n+1}$ wherein "$n$" represents an integer less than five and is inclusive of both straight-chain and branched-chain radicals such as methyl, ethyl, propyl, isopropyl, butyl, sec-n-butyl, and tert-butyl.

The manner and process of making and using the invention is illustrated by the following description and examples, which set forth the best mode contemplated by us of carrying out our invention so as to enable any person skilled in the art of insect control to make and use the same:

We have discovered that halophenyl- or lower-alkylphenyl N-lower-alkyl carbamates can be synergized to achieve faster knock-down and greater lethality by the addition of a combination of pyrethrins and certain pyrethrin-potentiators. This synergistic effect is completely unexpected since the addition of unpotentiated pyrethrins to the abovementioned carbamates slightly lowers the effectiveness of those carbamates as insecticides.

One advantage of the compositions of this invention is their relative lack of toxicity to warm-blooded animals and particularly to mammals. The pyrethrins and their potentiators are noted for their low toxicity to animal life; a representative carbamate, o-chlorophenyl-N-methyl carbamate, has $LD_{50}$ in various mammallian species of over 1300 milligrams per kilogram of body weight.

The exact proportions of the three components of the compositions of this invention in an insecticidal formulation will vary with the type of use in which the insecticide is employed, the method of application, the nature of the insect pests to be controlled, and other factors similarly encountered in the insecticidal art. The minimum amount of synergist that must be present per part by weight of the carbamate present in the insecticidal compositions of this invention is one-five hundredth part pyrethrins and one fortieth part of the pyrethrin-potentiator. While there is no theoretical upper limit to the amount of synergist that may be present, practical considerations limit the amount of pyrethrins and potentiator present to about one-half by weight of each per part of carbamate present. Optimum results are obtained when the ratio of carbamate to pyrethrins to potentiator is about 50 to 1.0 to 8.

The total concentration of these ingredients in a final insecticidal composition will vary with the form of application and type of use. The compositions of this invention can be formulated as concentrates or with carriers, as sprays, aerosols, or dusts. For some purposes it is preferred that the carriers include emulsions, or solutions in oils or organic solvents, and ancillary suspending and wetting agents. Solid carriers may also be employed including chalk, talc, bentonite, diatomaceous earth, silica, pyrophyllite, fuller's earth, lime, gypsum, flours derived from various organic wastes, and similar powders. The compositions may also contain other additives such as emulsifying agents, wetting agents, masking agents, etc. In these forms, the concentrations of active ingredients and the vehicles are adjusted so that flying insects are exposed to lethal amounts of space sprays or aerosols and crawling and hopping insects are exposed to surfaces that have been coated with lethal amounts of the compositions of this invention in dust or spray form. In general, compositions containing from about 0.025 percent to about 10 percent by weight of a synergistic combination of this invention are preferred and give excellent results.

The halophenyl and lower-alkylphenyl N-lower-alkyl carbamates suitable for the practice of our invention can be prepared according to the method outlined by Kolbezen et al., "Agricultural and Food Chemistry," 11, 864–870 (1954). Suitable carbamates include halophenyl and lower-alkylphenyl N-methyl, N-ethyl, N-isopropyl and N-butyl carbamates. The benzene halogen substituent should have an atomic weight greater than 25 and may be chloro, bromo, or iodo in ascending order of activity but in descending order of economic feasibility. At least one halo or lower-alkyl substituent must be in the ortho or meta positions with respect to the carbamyloxy group as the para isomers are relatively inactive as insecticides in this combination. Polyhalo- and polylower-alkylphenyl compounds are also synergised and fall within the scope of this invention. Among such polyhalo compounds there may be mentioned the N-lower-alkyl acrbamates of 2,4,6-trichlorophenol and 3,5-dichlorophenol. Other examples or carbamate compounds synergized by pyrethrins and pyrethrin-potentiators according to the present invention include N-lower-alkyl carbamates of alkylated phenols such as cresol, xylenol, m-ethylphenol, o-isopropylphenol, and m-tert-butylphenol. Mixed halogenated and alkylated phenol carbamates are also synergized by the addition of pyrethrins plus the aforementioned pyrethrin-potentiators and are also within the scope of the present invention. As a rule, the polyhalo compounds do not possess the degree of activity found with the mono halo compounds. The preferred carbamate useful in the practice of our invention, because of its high order of activity, higher solubility and low order of mammallian toxicity, is o-chlorophenyl-N-methyl carbamate.

The halophenyl N-lower-alkyl carbamates, which are the principal insecticides of the compositions of this invention, are anticholinesterase agents and cause extreme spasm of the abdominal and respiratory regions of the insects brought into contact with them, leading to ultimate death and leaving the body of the insect characteristically contorted. When used as single toxicants, these carbamates are slow-acting, both in knockdown and kill, against common household pests. Since these characteristics are important factors in evaluating household insecticides, the addition of pyrethrins and pyrethrin-potentiators to the carbamate serves the added function of giving quicker knockdown and a faster apparent kill to the final formulation.

The term pyrethrins is well known to those skilled in the art and includes pyrethrum flowers, the active insect-toxicant components extracted from the pyrethrum flowers, and the synthetic insect-toxicant equivalents and analogs thereof usually containing the chrysanthemumomonocarboxyl group. Among such products are commercial pyrethrin flower extracts, allethrin, and cyclethrin. The pyrethrins are characterized by a relatively quick knockdown of flying insects and the imposition of confused patterns on the insects' motions. After knockdown, periodic tremors of the insect thorax are observed indicating the breathing difficulties which may ultimately result in death.

The pyrethrin-potentiators useful in the practice of this invention include the 3,4-methylenedioxyphenyl compounds disclosed in U.S. Patent 2,431,845. Di-n-propyl 6,7-methylenedioxy - 3 - methyl-1,2,3,4-tetrahydronaphtholene-1,2-dicarboxylate is a preferred member of this class and has the following structural formula:

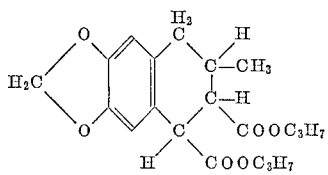

Another group of 3,4-methylenedioxyphenyl potentiators are piperine, piperic acid, its esters and related compounds as disclosed in U.S. Patents 2,425,530; 2,431,844; 2,458,856 and 2,550,737. Among such compounds is "piperonyl butoxide" which contains about 70 percent of the compound having the structural formula:

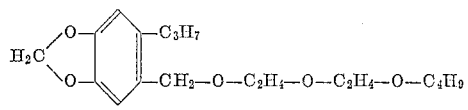

Sulphur containing derivatives of 3,4-methylenedioxyphenyl are also potentiators and include the mercaptans, sulfones and sulfoxides as described in U.S. Patents 2,456,991; 2,486,579; 2,486,445; and 2,578,302. Of these, "sulfoxide (n-octyl sulfoxide of isosafrole) represented by the formula:

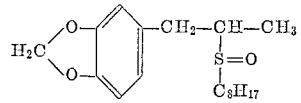

is particularly useful.

The dicarboxamides described in U.S. Patent 2,476,512 are also effective as pyrethrin-potentiators and are the full equivalents of the 3,4-methylenedioxyphenyl pyrethrin-potentiators in the practice of our invention. The dicarboxamides have the general formula:

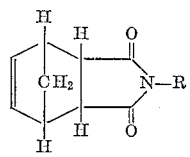

wherein R is an aliphatic or oxygen-interrupted aliphatic side-chain such as

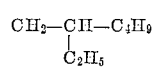

and —$C_3H_6$—O—$C_2H_4$—O—$C_6H_{13}$, both commercially available and known as Synergist MGK 264 and Synergist Number 6266, respectively. It should be noted that not all other known classes of pyrethrin-potentiators are useful in synergizing carbamate pyrethrin combinations; the chlorinated ether pyrethrin potentiators, for example, are not effective for the purposes of this invention.

The compositions of this invention were tested against the roach, *Blattella germanica*, and the housefly, *Musca domestica*. Table 1 summarizes the results obtained in a series of experiments using the direct spray method on *B. germanica*. In this series, the effect of adding 1 part of pyrethrins and 8 parts of a pyrethrin-potentiator to the same formulation containing 50 parts of various test carbamates was studied. The column headed "Carbamate Alone" gives the results obtained when only the carbamate was added to the formulation and the column headed "Synergized Carbamate" when the synergized carbamate was added. The carbamate synergist employed was the pyrethrins of commerce potentiated by the n-octyl sulfoxide of isosafrole. The full formulation consisted of 10,000 parts, the remainder being conventional diluents.

*Table 1*

| Carbamate tested | Percent kill (48 hours) | |
|---|---|---|
| | Carbamate alone | Synergized carbamate |
| o-Chlorophenyl-N-methyl | 68 | 99 |
| p-Chlorophenyl-N-methyl | 0 | 40 |
| 2,4,6-trichlorophenyl-N-methyl | 4 | 32 |
| Pentachlorophenyl-N-methyl | 2 | 24 |
| m-Chlorophenyl-N-methyl | 44 | 92 |
| 2,4,6-tribromophenyl-N-methyl | 0.5 | 55 |
| 3,4-dimethylphenyl-N-methyl * | 40 | 94 |
| 2,6-dimethylphenyl-N-methyl | 4 | 53 |
| Control (no carbamate) (O-Kill) | 0 | 0 |

*In this experiment, 100 parts of the carbamate was employed instead of the 50 parts used in the other experiments of the series.

The preferred carbamate of this invention, ortho-chlorophenyl-N-methyl carbamate, was tested against the roaches, *B. germanica* and chlordane-resistant *B. texas*, according to the Spray Test Method official with the Chemical Specialty Manufacturers Association (CSMA 1960 Blue Book pp. 239–240). In this series of tests the concentration of the carbamate was adjusted to give knockdowns and mortality of 50 to 75 percent of the test insects. The pyrethrins and various potentiators were then tested alone and added to the carbamate, alone and in combination, to quantitatively demonstrate the synergistic effect of the full combination on lethality. The results of this series of tests are summarized in Table 2.

*Table 2*

| | Parts carbamate | Parts pyrethrins | Parts potentiator | Percent kill (24 hours) |
|---|---|---|---|---|
| A | 50 | 0.0 | 0 | 68 |
| | 0 | 0.5 | 0 | 0 |
| | 0 | 0.0 | 4 | 0 |
| | 0 | 0.5 | 4 | 0 |
| | 50 | 0.5 | 0 | 63 |
| | 50 | 0.0 | 4 | 60 |
| | 50 | 0.5 | 4 | 97 |
| B | 0 | 0.5 | 4 | 0 |
| | 50 | 0.0 | 4 | 65 |
| | 50 | 0.5 | 4 | 97 |
| C | 0 | 0.0 | 4 | 0 |
| | 0 | 0.5 | 4 | 0 |
| | 50 | 0.0 | 4 | 0 |
| | 50 | 0.5 | 4 | 98 |
| D | 0 | 0.0 | 4 | 0 |
| | 0 | 0.5 | 4 | 0 |
| | 50 | 0.0 | 4 | 58 |
| | 50 | 0.5 | 4 | 96 |

The pyrethrin-potentiators used in group A, B, C, and D were the n-octyl sulfoxide of isosafrole, n-propyl isome, the dicarboxamide MGK 264, and piperonyl butoxide, respectively.

Referring to Table 2, it will be noted that concentrations of pyrethrins and potentiators which are sublethal will improve the lethality of the carbamates used. Moreover, use of either the pyrethrin or the pyrethrin-potentiator in combination with the carbamates at the test concentrations, appears to slightly reduce the mortality obtained in the test. However, when the three components are combined, an almost total kill results. This same high order of kill is also evident against the chlordane-resistant roach *B. texas*.

Table 3 summarizes the results of a series of tests demonstrating the rapid knockdown capabilities against roaches of some typical compositions of this invention. The carbamate used was the preferred o-chlorophenyl-N-methyl carbamate and the tests were run in the Standard Roach Test Chamber (CSMA 1960 Blue Book) under conditions approximating domestic household use. Using the compositions of this invention, all the insects which are knocked down remain down, having received a lethal dose of the insecticidal compositions. This is in contrast to the Official Test Insecticide which achieves almost total knockdown within a short time, but from which many of the insects recover from the knockdown effect within an hour.

*Table 3*

PERCENT KNOCKDOWN

| Time (minutes) | A | B | C | D | E | F |
|---|---|---|---|---|---|---|
| 5 | 0 | 0 | 40 | 80 | 0 | 100 |
| 10 | 1 | 30 | 72 | 98 | 0 | 100 |
| 15 | 34 | 70 | 82 | 100 | 0 | 98 |
| 20 | 44 | 82 | 94 | 100 | 1 | 95 |
| 25 | 54 | 90 | 98 | 100 | 10 | 87 |
| 30 | 54 | 96 | 98 | 100 | 10 | 80 |
| 35 | 62 | 96 | 98 | 100 | 6 | 75 |
| 40 | 62 | 96 | 100 | 100 | 1 | 75 |
| 45 | 62 | 96 | 100 | 100 | 1 | 75 |
| 50 | 62 | 96 | 100 | 100 | 1 | 74 |
| 55 | 62 | 96 | 100 | 100 | 1 | 72 |
| 60 | 62 | 96 | 100 | 100 | 1 | 70 |

PERCENT MORTALITY

| | A | B | C | D | E | F |
|---|---|---|---|---|---|---|
| 24 hours | 78 | 96 | 100 | ------ | 1 | 65 |

A = 0.5 percent o-chlorophenyl-N-methyl carbamate.
B = 0.5 percent o-chlorophenyl-N-methyl carbamate:
   0.005 percent pyrethrins.
   0.04 percent sulfoxide of isosafrole.
C = 0.5 percent o-chlorophenyl-N-methyl carbamate:
   0.01 percent pyrethrins.
   0.08 percent sulfoxide of isosafrole.
D = 0.5 percent o-chlorophenyl-N-methyl carbamate:
   0.02 percent pyrethrins.
   0.16 percent sulfoxide of isosafrole.
E = 0.01 percent pyrethrins:
   0.08 percent sulfoxide of isosafrole.
F = 0.1 percent pyrethrins (Official Test Insecticide).

Table 4 sets forth another series of tests demonstrating the effectiveness of the compositions of this invention against the common housefly, *Musca domestica*. These tests, run according to the standard Peet-Grady test method under simulated household conditions, were conducted with the standard test flies and with the Fowler strain of DDT-resistant flies. The latter are relatively resistant to chlorinated toxicants such as DDT as well as to pyrethrin combinations.

*Table 4*

| | Test formulation | Percent by weight | 10 minute knockdown | | 24 hour mortality | |
|---|---|---|---|---|---|---|
| | | | Standard fly | Resistant fly | Standard fly | Resistant fly |
| 1 | o-Chlorophenyl-N-methyl carbamate. | 0.5 | 88 | 87 | 53 | 50 |
| 2 | o-Chlorophenyl-N-methyl carbamate. | 1.0 | 93 | 89 | 75 | 67 |
| 3 | o-Chlorophenyl-N-methyl carbamate. | 1.0 | | | | |
| | Pyrethrins | 0.02 | 97 | 91 | 94 | 83 |
| | n-Octyl sulfoxide of isosafrole. | 0.16 | | | | |

Various modifications of this invention will suggest themselves to those skilled in the art and the invention is not to be limited to the above-offered examples. The subject matter which the applicants regard as their invention is particularly pointed out and distinctly claimed as follows:

1. Synergistic insecticidal compositions comprising
   (1) N-methyl-phenyl carbamate having on the phenyl ring at least one substituent in a position other than that para to the carbamyloxy group, said substituent being selected from the group consisting of lower-alkyl and halogens having an atomic weight greater than 25;
   (2) at least one five hundredth but less than 0.5 part of a pyrethrin; and
   (3) at least one-fortieth but less than 0.5 part of a 3,4-methylene - dioxyphenyl - pyrethrin - potentiator, each per part by weight of the said carbamate.

2. Compositions according to claim 1 wherein the ratio of carbamate to pyrethrins to potentiator is about 50 to 1 to 8.

3. Synergistic insecticidal compositions comprising
   (1) N-methyl-phenyl carbamate having on the phenyl ring lower-alkyl in a position other than that para to the carbamyloxy group;
   (2) at least one five hundredth but less than 0.5 part of a pyrethrin; and
   (3) at least one-fortieth but less than 0.5 part of a 3,4-methylene - dioxyphenyl - pyrethrin - potentiator, each per part by weight of the said carbamate in the said compositions.

4. Synergistic insecticidal compositions comprising
   (1) N-methyl-phenyl carbamate having on the phenyl ring a halogen having an atomic weight greater than 25 in a position other than that para to the carbamyloxy group;
   (2) at least one five hundredth but less than 0.5 part of a pyrethrin; and
   (3) at least one-fortieth but less than 0.5 part of a 3,4-methylene - dioxyphenyl - pyrethrin - potentiator, each per part by weight of the said carbamate in the said compositions.

5. Compositions according to claim 4 wherein the carbamate is o-chlorophenyl-N-methyl carbamate.

6. The method of killing insects which comprises contacting the insects with a lethal amount of a synergistic insecticidal composition comprising
   (1) N-methyl-phenyl carbamate having on the phenyl ring at least one substituent in a position other than that para to the carbamyloxy group, said substituent being selected from the group consisting of lower-alkyl and halogens having an atomic weight greater than 25;
   (2) at least one five hundredth but less than 0.5 part of a pyrethrin; and
   (3) at least one-fortieth but less than 0.5 part of a 3,4-methylene - dioxyphenyl - pyrethrin - potentiator, each per part by weight of the said carbamate.

7. The method of killing insects which comprises contacting the insects with a lethal amount of a synergistic insecticidal composition comprising
   (1) N-methyl-phenyl carbamate having on the phenyl ring in a position other than para to the carbamyloxy group, at least one halogen having an atomic weight greater than 25;
   (2) at least one five hundredth but less than 0.5 part of a pyrethrin; and
   (3) at least one-fortieth but less than 0.5 part of a 3,4-methylene - dioxyphenyl - pyrethrin - potentiator, each per part by weight of the said carbamate.

8. The method according to claim 7 wherein the carbamate is o-chlorophenyl-N-methyl carbamate.

9. The method of killing insects which comprises contacting the insects with a lethal amount of a synergistic insecticidal composition comprising
   (1) N-methyl-phenyl carbamate having on the phenyl ring lower-alkyl in a position other than para to the carbamyloxy group;
   (2) at least one five hundredth but less than 0.5 part of a pyrethrin; and
   (3) at least one-fortieth but less than 0.5 part of a 3,4-methylene - dioxyphenyl - pyrethrin - potentiator, each per part by weight of the said carbamate.

References Cited in the file of this patent

UNITED STATES PATENTS

| | | |
|---|---|---|
| 2,425,530 | Harvill | Aug. 12, 1947 |
| 2,431,844 | Synerholm | Dec. 2, 1947 |
| 2,431,845 | Synerholm | Dec. 2, 1947 |
| 2,456,991 | Prill | Dec. 21, 1948 |
| 2,476,512 | Schreiber | July 19, 1949 |
| 2,550,737 | Wacks | May 1, 1951 |
| 3,035,969 | Hartle et al. | May 22, 1962 |

OTHER REFERENCES

J. Sci. Food Agric., vol. 9, October 1958, pp. 666–672.

UNITED STATES PATENT OFFICE
CERTIFICATE OF CORRECTION

Patent No. 3,134,712                                    May 26, 1964

William G. Bywater et al.

It is hereby certified that error appears in the above numbered patent requiring correction and that the said Letters Patent should read as corrected below.

Column 2, line 43, for "acrbamates" read -- carbamates --; column 4, Table 2, last column, line 16, for "O" read -- 62 --; column 5, Table 3, under the heading "PERCENT MORTALITY", fifth column, strike out the leaders and insert instead -- 100 --.

Signed and sealed this 29th day of September 1964.

(SEAL)
Attest:

ERNEST W. SWIDER
Attesting Officer

EDWARD J. BRENNER
Commissioner of Patents